United States Patent [19]

France

[11] Patent Number: 4,659,274

[45] Date of Patent: Apr. 21, 1987

[54] COMPUTER CONTROLLED LOAD-OUT SYSTEM

[75] Inventor: Rodney C. France, Paducah, Ky.

[73] Assignee: Accutrol Incorporated, Paducah, Ky.

[21] Appl. No.: 671,084

[22] Filed: Nov. 13, 1984

[51] Int. Cl.[4] .................... B65G 67/22; G01G 19/04
[52] U.S. Cl. .................................. 414/21; 177/163;
177/DIG. 8; 414/329; 414/786
[58] Field of Search ............... 414/21, 160, 161, 199,
414/200, 206, 208, 295, 299, 328, 329, 397, 786;
177/25, 163, DIG. 8; 141/1, 83, 94, 95, 96, 98,
182, 231-234, 263, 264, 270, 283

[56] References Cited

U.S. PATENT DOCUMENTS

| | | | |
|---|---|---|---|
| 1,970,291 | 8/1934 | Everhard | 414/21 |
| 3,235,104 | 2/1966 | Morawki et al. | 414/329 |
| 4,094,367 | 6/1978 | Jones et al. | 177/163 X |
| 4,284,380 | 8/1981 | Brumbaugh, Jr. et al. | 414/329 X |
| 4,317,496 | 3/1982 | Krause | 177/163 |
| 4,372,730 | 2/1983 | Ladt | 414/786 |
| 4,401,175 | 8/1983 | Caldicott | 177/163 |
| 4,445,581 | 5/1984 | Caldicott | 177/163 |
| 4,460,308 | 7/1984 | Moon et al. | 414/329 X |

FOREIGN PATENT DOCUMENTS 2704726 8/1977 Fed. Rep. of Germany.

*Primary Examiner*—Joseph E. Valenza
*Assistant Examiner*—David A. Bucci

*Attorney, Agent, or Firm*—Woodard, Weikart, Emhardt & Naughton

[57] ABSTRACT

A computer controlled system is provided for regulating the flow of coal into a railway car or the like. The coal flows into the car through a loading chute. When the total weight in the car reaches the desired weight as determined by spaced platform scales, the computer control shuts off the flow by actuating the flow gate. The difference in the weight of the front and rear car trucks is noted and the inclination of the loading chute is regulated up or down by the computer control through operation of a hydraulic cylinder. If the chute is raised, the height of the coal within the car is raised and with all factors the same, the front of the car will be loaded more. As the chute is lowered, the height of the coal that can enter the car will be less and, thus, a shift of the weight to the back of the car can be effected. In accordance with the computer reading for each car, the position of the chute can be regulated for each following car of the same size and height. The computer remembers the height for the optimum loading position for each size car in the train. The front and rear ends and the height of each car are detected by a photocell circuit that provides an input to the computer. The position of the loading chute regulates the height of the coal in the car since the bottom lip of the chute cuts off the flow of the coal when the coal reaches the height of the lip. The coal will back up in the chute and the lip will simply smooth off the top of the coal thus regulating the height.

31 Claims, 11 Drawing Figures

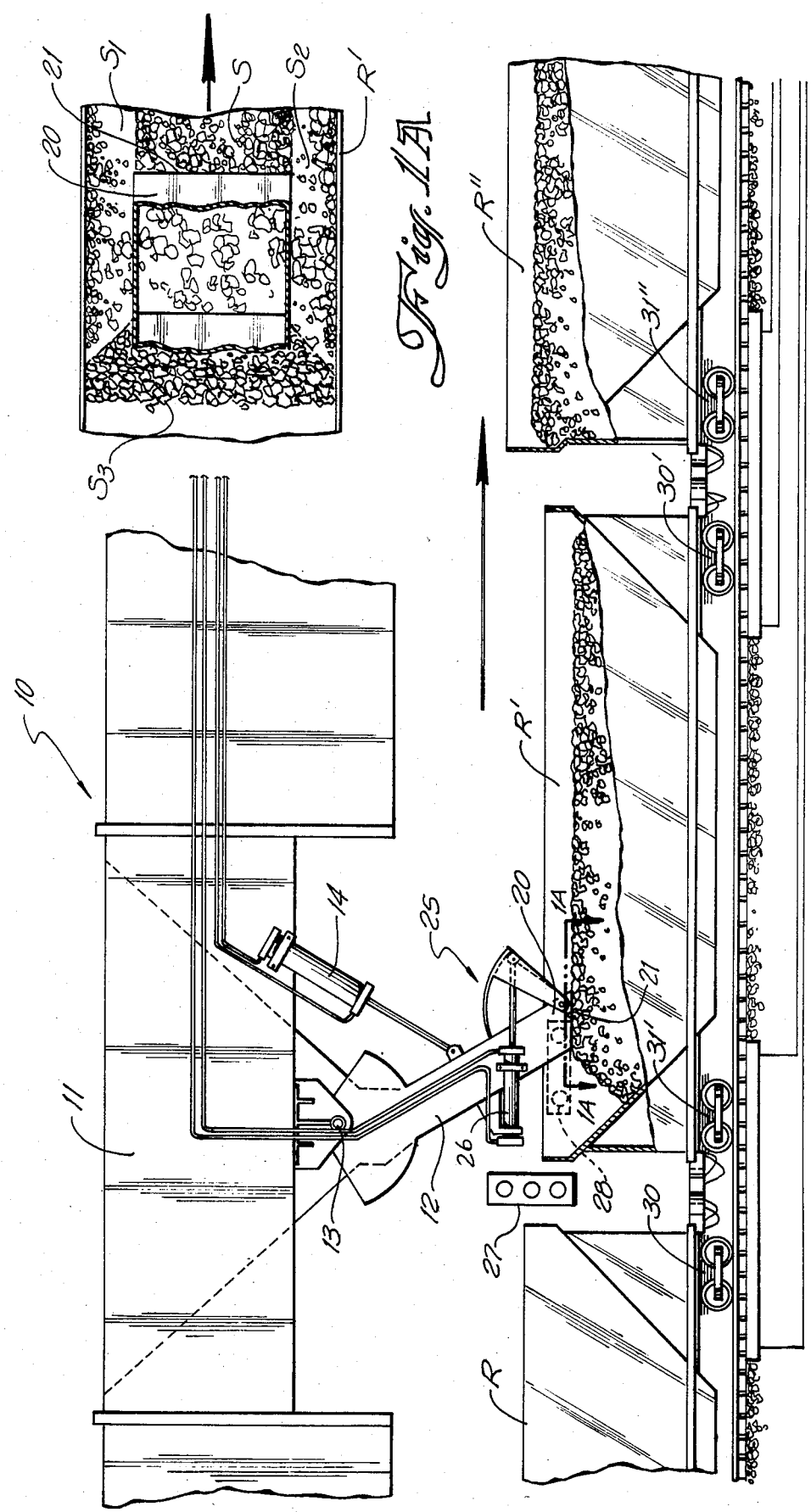

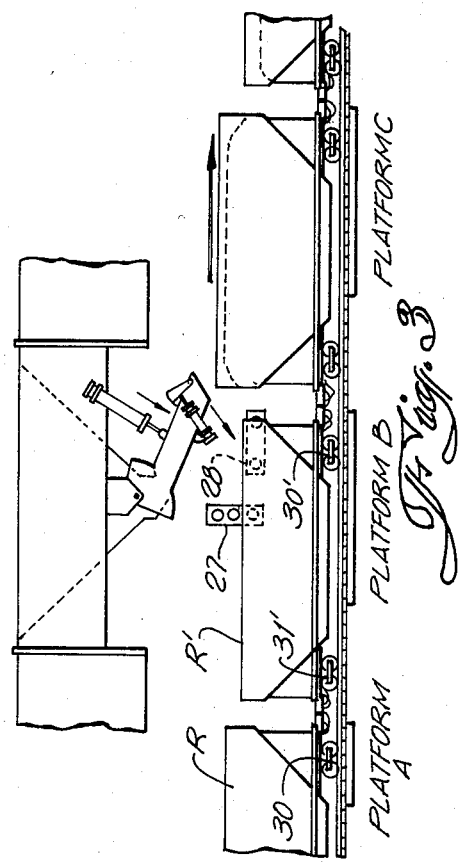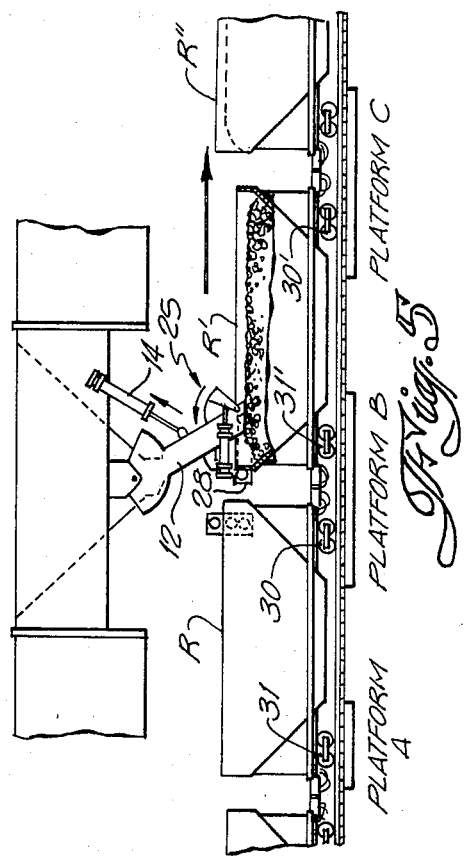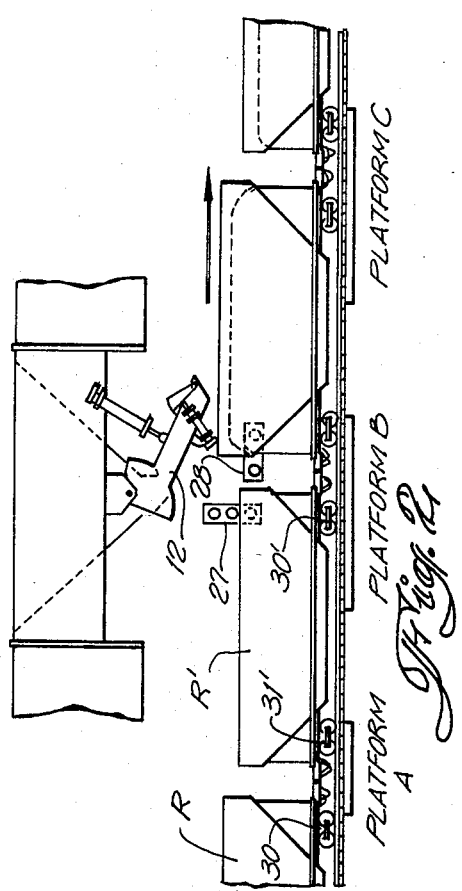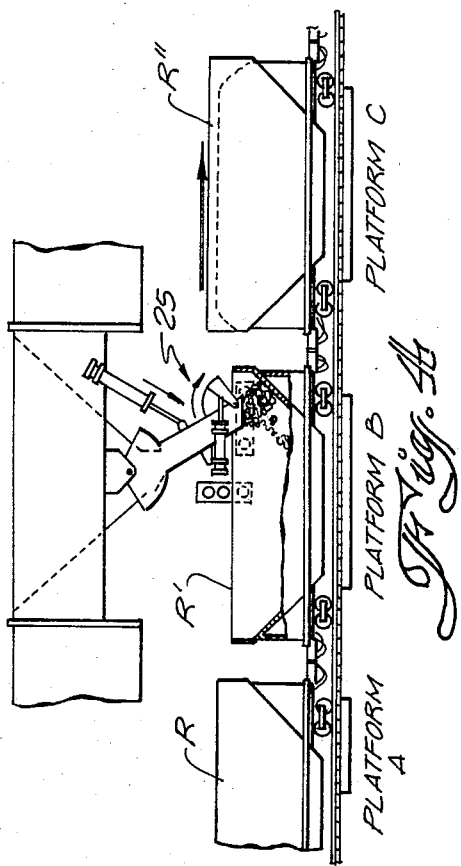

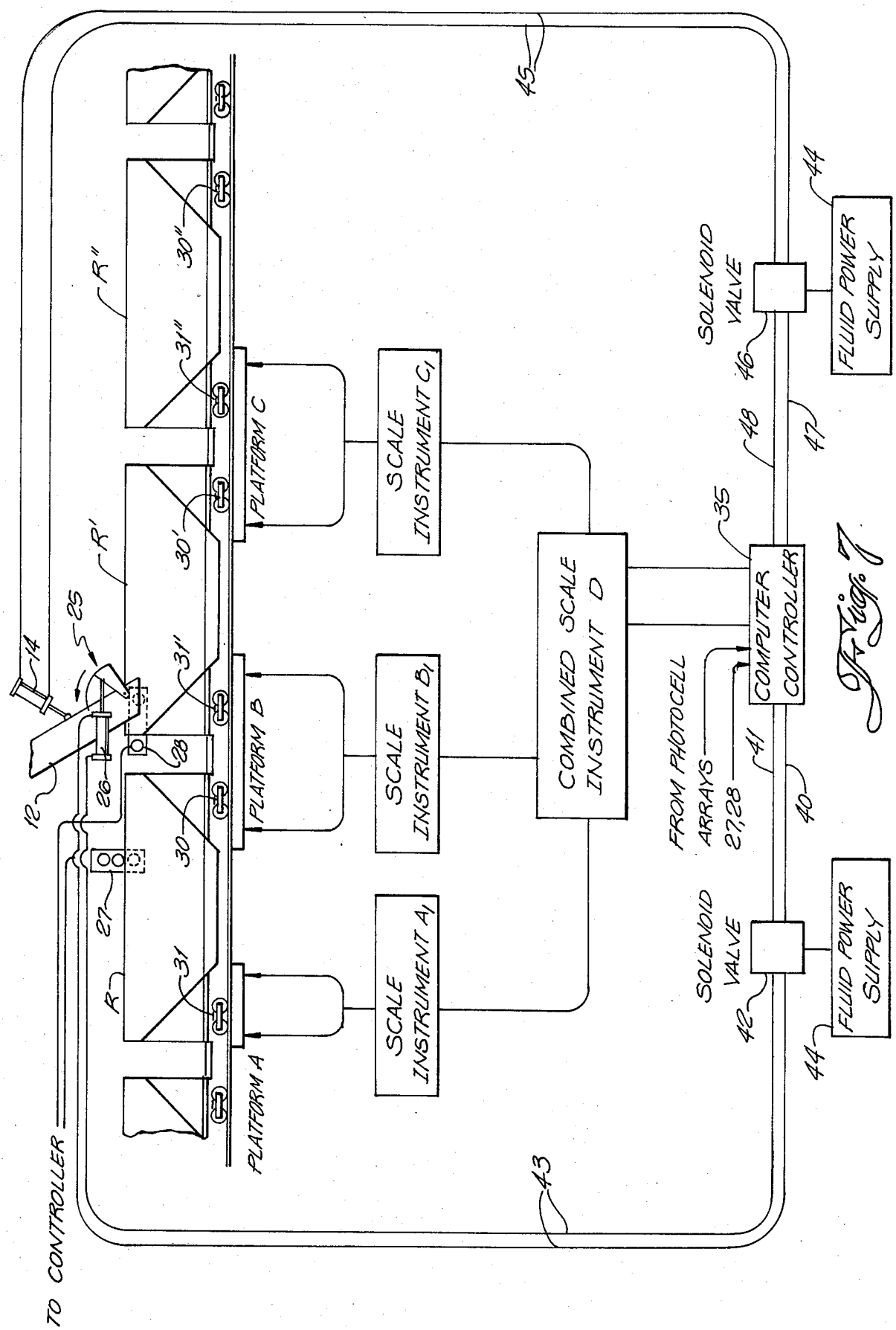

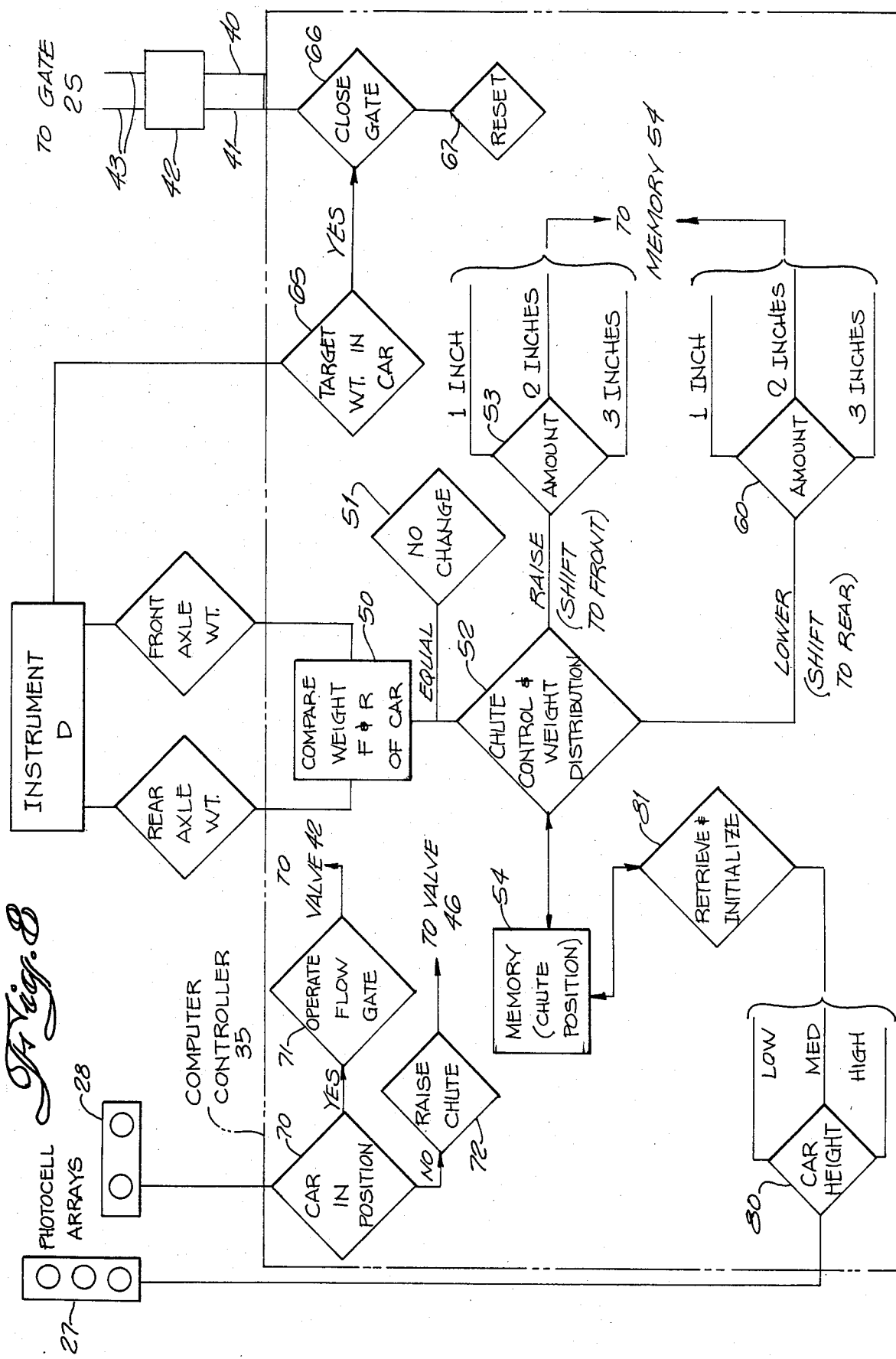

COMPUTER CONTROLLED LOAD-OUT SYSTEM

FIELD OF THE INVENTION

The present invention generally relates to loading of fluent bulk material into rail cars, and more particularly, to the loading of material in such a manner to provide even distribution along the length of the car.

BACKGROUND OF THE INVENION

Load-out systems for handling bulk material, such as coal, are gaining wide acceptance in the mining transportation field. It is now possible with modern load-out systems to quickly load a train of rail cars while the train is moving forward at a constant speed. This innovation has greatly enhanced the efficiency of the transportation of bulk material dramatically.

One of the most successful load-out systems is shown in U.S. Pat. No. 4,372,730, issued to Carroll H. Ladt, Feb. 8, 1983. In this system, pivoting load-out chutes feed the coal into the rail cars in a very efficient manner. With a skilled operator, the distribution of coal within the car can be made substantially evenly spaced between the supporting trucks of the car. More effective control over the coal is provided by including a curved blade gate adjacent the lower end of the chute. This system successfully loads the coal in a rapid manner without spillage while the train is proceeding at a substantially constant speed of about one-half mile per hour.

A similar arrangement for loading rail cars as the car continuously moves forward is shown in the U.S. Pat. No. 4,284,380, issued Aug. 18, 1981. In this system, the operator controls the key functions including the speed of the conveyor feeding the coal from the storage bin to the loading hopper. Depending on the skill of the operator in manually changing the conveyor speed and inclination of the feed chutes, substantially even loading of the cars can be approached as the train moves through the load-out station. Because of the limited capacity of the conveyor feeding the chute, the train in the '380 patent can move only one-half the speed as used in the hopper feed type of load-out system shown in the '730 patent.

Furthermore, the continuously running conveyor is relied upon solely to provide the regulation of the flow of material with the chute above the rail cars serving simply to channel the coal into the car. Thus, when the flow on the conveyor is uneven, as occasionally occurs, the rate of flow into the car varies, which in turn makes for uneven loading. This adds to the tedious job of the operator in trying to evenly load the car. The speed of the conveyor and/or the inclination of the chute must be temporarily adjusted in an attempt to smooth out the flow.

The necessity for utilizing an operator to continuously monitor the prior art systems, as described above, has substantially reduced their cost effectiveness. From analysis made in the industry, the need has been identified to provide a computer controlled system for bulk loading material into a rail car. In order to be accepted in the field, the computer control system should utilize the existing equipment hardware and be capable of automatically distributing the load within different size cars.

SUMMARY OF THE INVENTION

It is accordingly one of the main objects of the present invention to provide a control system and method for automatically operating existing load-out chute equipment to provide even distribution and accurate weight of bulk material in every car.

It is another object of the present invention to provide a computer controlled load-out system also utilizing readily available control components to be connected in a low cost, efficient manner to existing pivoting chute load-out systems.

It is still another object of the present invention to provide a computer control system for filling rail cars with bulk material, such as coal, in a moving train wherein operator intervention is unnecessary, but with even loading of the cars assured each time.

Another object of the present invention is to provide a computer control system and method wherein raising and lowering the chute to regulate the height of material in a car provides the adjustment necessary for changing the distribution in a following car in line of the comparable type and size.

Another object of the present invention is to provide a computer-assisted apparatus and method for properly raising and lowering the chute to properly distribute the load between the front and the rear of the car by changing the positioning of the discharge end of the chute in the car allowing material to flow evenly from the chute and the top of the load to be even or smooth.

Additional objects, advantages and novel features of the invention will be set forth in part in the description which follows and in part will become apparent to those skilled in the art upon examination of the following or may be learned by a practice of the invention. The objects and advantages of the invention may be realized and attained by means of the instrumentalities and combinations particularly pointed out in the appended claims.

The load-out chute system with computer control is capable of directing the flow of relatively large quantities of bulk material, such as coal, into a rail car that is moving and achieve substantially even distribution of the coal between the two trucks of the car. In order to achieve this result of obtaining a target weight within the car, and at the same time distributing the weight evenly between the front and the rear of each car, there is provided a scale means for weighing material sufficient to fill each car up to the target weight; a load-out chute receiving the material and substantially evenly feeding the material into the car as the car moves forward at a steady rate; regulating means for establishing the height of the material fed into each car; computer means for comparing the weight of the material in the front and the rear of each car as the train is in motion; and adjusting means for changing the regulating means, if necessary, to provide the proper even distribution for each comparable car following in line.

In accordance with the invention, the height of the material in each car is adjusted by the regulating means which includes the discharge end on the load-out chute extending down into each car. A lip on the discharge end confines excess material in the chute during loading and assuming the proper positioning of the chute as determined by the computer controller of the invention, the car is substantially evenly loaded along its length. The adjusting means includes a movable mounting for the chute and a hydraulic cylinder for raising the chute to shift the weight toward the front of the car or, alternatively, lowering the chute to shift the weight toward the rear.

Preferably, the cars are weighed one at a time in line by scales supporting the front and rear support trucks independently. The computer controller compares the weight signals from the front and rear of each car with the standard or target weight desired, such as one hundred tons, and then activates adjusting means to substantially even the load for comparable cars in the train that follow.

Preferably, photocell arrays are provided for denoting the position of each car at the load-out station and sensing the height of each car.

In order to adjust the flow chute, the computer controller raises the chute to shift the distribution to the front and lowers the chute to shift the load to the rear. This is the direct opposite of prior practice, such as in the '380 patent, where the chute is lowered to reduce the flowing material friction and increase the feed rate, and vice-versa.

In accordance with a broader aspect of the present invention, a novel apparatus and method are provided for loading fluent bulk material into a series of moving containers passing a load-out station. The apparatus includes a movable load-out chute with a flow gate and discharge end at the load-out station; means for controllably opening and closing the flow gate for each container; means for positioning the discharge end of the load-out chute at a plurality of vertical levels; scale means for etecting imbalance in a first container loaded with fluent bulk material by the apparatus; and means for compensating for imbalance detected by the scale means, the compensating means including means for determining a new vertical level for the discharge end of the load-out chute for loading a subsequent container. The novel method of loading fluent bulk material includes the steps of supplying fluent bulk material to a movable load-out chute; positioning the discharge end of the load-out chute at a first vertical level for loading a first container; controllably opening and closing the flow gate of the load-out chute to initaite and terminate loading of the first container; detecting imbalance in the first loaded container; compensating for imbalance detected in the detecting step, the compensating step including determining a new vertical level for the discharge end of the load-out chute for loading a subsequent container; and controllably opening and closing the flow gate to initiate and terminate loading of the subsequent container.

The optimum chute position for the most recent comparable car in the train is stored in memory of the computer controller. In accordance with still another aspect, the cutoff of the flow of material is responsive to either reaching the target weight or coming to the end of the car, whichever occurs first.

BRIEF DESCRIPTION OF THE DRAWINGS

FIG. 1 is a side elevational view of the load-out chute system for evenly filling of rail cars (partially broken away to show load) in accordance with the present invention;

FIG. 1A is a cross sectional view (partially broken away) taken along line 1A—1A of FIG. 1 showing the regulation of height of coal filling the car and the smoothing of the top by the lip of the discharge end of the chute;

FIG. 2 is a first of a series of sequential showings of the inventive method, the load-out chute being raised to clear the ends of adjacent railway cars;

FIG. 3 is the second sequential showing with the chute starting to be lowered into position in the next in-line car;

FIG. 4 is the third sequential view showing the chute in the lowered feed position with the flow gate open and material being loaded into the front of the car;

FIG. 5 is the last of the sequential drawings showing the completion of the filling operation with the material being evenly distributed over the length of the car and the chute starting to be raised;

FIG. 7 is a schematic diagram showing the overall basic weighing and control system of the present invention; and FIG. 8 is a schematic flow chart of the computer software utilized as one means for carrying out the operation of the present invention.

DETAILED DESCRIPTION OF THE PREFERRED EMBODIMENT

Figure 6A:
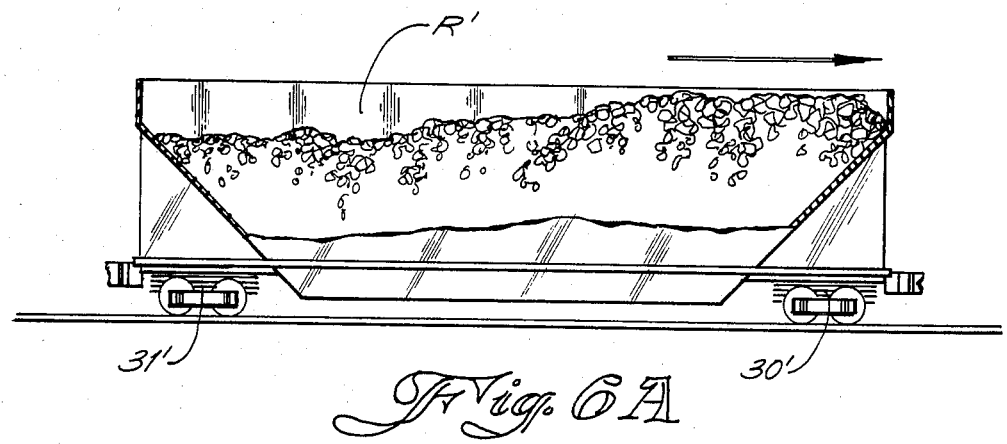
FIGS. 6A and 6B show improperly loaded cars utilizing loading equipment and techniques of the prior art; namely, overloaded on the front truck in FIG. 6A and overloaded on the rear truck in FIG. 6B.

With reference now to the drawings, and to FIG. 1 in particular, a more detailed description of the preferred embodiment of the present invention can be given. A load-out system generally designated by the reference numeral 10 is shown and includes a hopper 11 for receiving fluent material, such as coal, from a connected mining, processing and bulk material handling apparatus (not shown). The hopper 11 feeds the coal into a flow regulating chute 12 provided with a pivotal mounting including pivot pin 13. A hydraulic motor, such as a relatively large hydraulic cylinder 14, is provided with its piston rod connected to the upper side of the chute 12. When the cylinder is actuated, as will be seen in greater detail below, the chute 12 is raised or lowered with respect to in-line rail cars R, R' and R''.

The flow regulating chute 12 includes a discharge end 20 that extends down into the rail cars such as shown with respect to rail car R' in FIG. 1. The discharge opening of the chute 12 is defined by a discharge flow lip 21. As the coal is exiting the discharge opening, the flow lip 21 serves to smooth the upper surface in both the longitudinal, as well as the transverse directions (note FIG. 1A). It will be realized that the chute 12 floods the car and once the initial forward end is filled (see FIG. 4), excess material backs up into the discharge end 20 smoothly cutting off the flow and limiting the height of the coal in the car R', as shown. As will be apparent from viewing FIG. 1A, the relatively smooth top surface S of the center section of coal is flanked by 45° symmetrical side sections with relatively smooth top surfaces $S_1$, $S_2$. An end section is also provided from the natural outflow of the coal with relatively smooth top surface $S_3$ also extending at a substantially 45° angle. This arrangement thus provides even lateral and end loading across the car.

A curved blade flow gate is pivotally mounted on the discharge end 20 of chute 12, as generally designated by the reference numeral 25. An operating hydraulic cylinder 26 is mounted on the chute to open and close the gate 25 at the proper time in the cycle. A photocell array 27 is positioned adjacent the track to sense the car heights, and a second photocell array 28 mounted adjacent thereto is for sensing the ends of the car. More particularly, the car heights sensor means includes typically three photocells in a vertical array. When a low car is present, such as car R', the low photocell is activated; a medium size car, such as car R, covers the lower two photocells; and the high car, such as R", covers all three photocells, so that the difference in the car heights is determined. The two photocells of the photocell array 28 are arranged horizontally and include a front photocell to detect the front of the car, and a rear of the car photocell in the rear of the array.

Each of the rail cars is supported on front and rear trucks 30, 31, respectively. Each truck typically includes a pair of axles and a wheel on each end of the axles for engagement with the track. One aspect of the preferred embodiment is the use of coupled-in-motion weighing which requires three scale platforms A, B, C (see FIG. 7). A scale instrument ($A_1$) ($B_1$, $C_1$) is connected to each of the corresponding platforms A, B, C, respectively. These scales are connected to instrument D that processes the signals for weight and inputs the signals to computer controller 35. The photocell arrays 27, 28 are connected to the controller 35 (see FIG. 7) and provide the appropriate signals to indicate the height of the car and the presence of the car at the load-out station (see FIGS. 2–5). The computer controller 35 includes leads 40, 41 to a solenoid valve 42 supplying hydraulic pressure through feed lines 43 from a fluid power source 44 to the cylinder 26 for gate 25. Similarly, fluid supply lines 45 feed the cylinder 14 from solenoid valve 46 operated by electrical control lines 47, 48.

Thus, from the above, the basic operation of the computer controlled system for loading rail cars of the present invention can be seen. The front truck 30 of the empty car R (FIG. 3) crosses scale platform A and the weight is sent to combined scale instrument D which retains it in memory until the rear truck of the car R crosses the same scale platform A (FIGS. 5 & 7). The total tare or empty weight then is stored in memory in instrument D for later use.

As the car R approaches platform B, the photocell array 27 determines the height of the car (see FIG. 5) and when the front of the car clears the chute 12, that is the car R' is in position for the chute to be lowered, the front photocell of the photocell array 28 is covered and the chute 12 is lowered (FIG. 3). The gate 25 is opened when the full lowered position is reached (FIG. 4) and the coal or other fluent material floods the front of the car.

The train continues to proceed forward and the car R' is filled evenly, as shown. The front truck 30' is on the scale platform C (see FIGS. 1, 5 and 7). At this time, the rear truck 31' of the car R' is on the platform B and the car is loaded to the proper target weight, as determined by the scales and computer controller 35, usually one hundred tons. The flow gate 25 closes and the chute 12 is raised out of the car R' (see FIG. 2). At this time, the car R" rear truck 31" is still on platform C along with the front truck 30', as described above. The rear truck 31' shares the platform B with the front truck 30 of the empty car R. The known weights of the previously weighed car R" rear truck and the front truck 30 of the empty car R are then subtracted in combined scale instrument D from the total weight on the platforms C and B, respectively. This then provides the gross weight of the filled coal carrying car R'. If the tare weight of car R' is also subtracted from this gross weight registered in the instrument D, then the net weight of the coal loaded in car R' is known. Each following car in line is similarly weighed and the weight calculated.

The instrument D provides the weight signal for both the front axle and the rear axle of the car R', as determined in accordance with the described procedure above. As shown in FIG. 8, instrument D transmits the rear axle weight and the front axle weight to the controller 35 where the two signals are processed. The computer controller 35 can be any suitable commercial programmable controller, such as the commercially available Modicon 584 Controller.

Figure 6B:
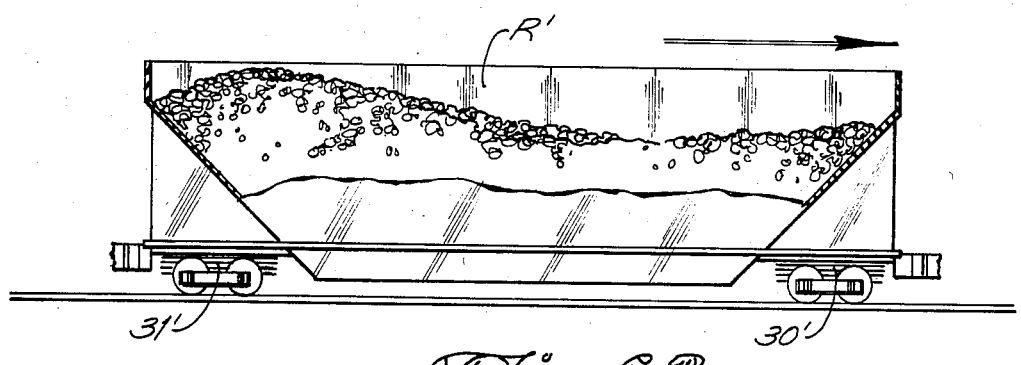
Figure 6C:
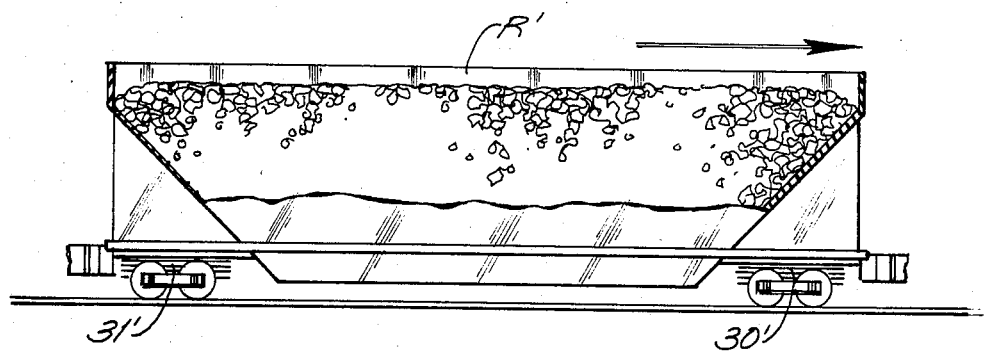
FIG. 6C illustrates a properly loaded rail car with evenly distributed material over both trucks in accordance with the principles of the present invention.

In program step 50, the two axle weights are compared. If the car is evenly loaded (axle weights are equal), the signal is given for no change, the operation of controller 35 moves immediately to step 51, and no other action needs to be taken; i.e. no control movement of the chute 12 is made (see FIG. 6C).

If, on the other hand, the weights of the front and rear trucks 30', 31' are uneven, the program moves immediately to chute control and weight distribution step 52. As is known, the unevenness can occur as a result of a change in any number of factors, such as the speed of the train, the grade, size, density and/or texture of the coal, the ash content, the moisture content of the coal and/or ambient conditions such as humidity and temperature. If the front truck 30' is light (shown exaggerated in FIG. 6B), a signal is given to raise the chute 12 at step 53 so as to shift the load toward the front of the car R'. The incremental amount that the front of the car is light is registered and either one inch, two inches or three inches is added to the adjusted height and fed to memory 54 denoting the new chute position for the next car in line of comparable size.

Similarly, if the comparison at step 50 shows that the front of the car is heavy (see FIG. 6A), the program shifts to step 60 where the chute 12 is indicated to require lowering in order to shift the weight toward the rear of the car R'. Depending on the amount indicated by the discrepancy, an order for resetting the chute position is sent to memory 54.

Instrument D also controls through the controller 35 the solenoid valve 42 that operates the cylinder 26 for curved blade gate 25. Once instrument D determines that the full target weight is supplied to the car R', step 65 receives a positive signal to activate the close gate flag 66. The solenoid valve 42 is activated by a signal over the lines 40, 41. At the same time, step 67 resets the controller 35 for the next car R in line.

The photocell array 28 indicates to the computer controller 35 when the car R' is in position to receive the chute 12, as denoted by step 70 (see FIG. 8), and upon lowering the discharge end 20 of chute 12 into the car R', opening of the flow gate 25 at flag 71 proceeds. The chute 12 remains in position and the gate 25 remains open until the target weight is made, as determined at step 65, or the rear photocell of the array 28 is uncovered (see FIG. 5), whichever event occurs first. The chute 12 is actually raised by the signal from flag 72; the solenoid valve 46 providing the operation. To reemphasize, if the solenoid valve 42 is not previously operated by meeting the target weight at flag 65, the valve 46 is operated to close the gate valve 25 and cut off the flow of coal when the end of the car is reached to assure no spillage of coal during the last phase of filling.

The photocell array 27 feeds a signal to step 80 in the controller 35 denoting car height as either low, medium or high. The next step at 81 retrieves and initializes the memory 54 to provide the proper chute position for the designated car height. The chute control and weight distribution step 52 is then properly set for the amount of change to be provided to the next in-line car of the same height, if indeed change is needed.

In summary, it can be seen that numerous benefits and advantages are obtained by using the control system of the present invention. A scale means A, B, C weighs the material that is fed through a load-out chute 12 into each car R in a train. The load-out chute 12 includes a regulating lip 21 to assure the proper height of material along the full length of the car R' being filled, and thus even loading on the front and rear trucks 30, 31.

Advantageously, excess coal backs up in the discharge end 20 assuring a constant supply right at the point of fill of the car. This automatically prevents starving or excess filling so prevalent in prior art arrangements, except where the rapid reflexes and skill of the operator is able to prevent it. The result is relatively smooth top surfaces $S-S_3$ with little or no variations or undulations, as are predominate and inevitable in the surface of coal loaded in cars with the prior art procedures.

A computer controller 35 with programmed steps is operative to compare the weight of material in the front and the rear of each car, and then provide a feedback signal to the memory 54 so that the chute position is changed for the next car of that comparable size. Thus, if the density, grade and/or texture of coal being loaded, the moisture and/or ash content of the coal, the ambient temperature and/or humidity, or any other parameter changes at any time, the proper adjustment is made for the next car in line (and each subsequent car) so that substantially equal loading is assured for the full train.

The foregoing description of a preferred embodiment of the present invention has been presented for purposes of illustration and description. It is not intended to be exhaustive or to limit the invention to the precise form disclosed, and obviously many modifications and variations are possible in light of the above teachings. The embodiment was chosen and described in order to best explain the principles of the invention and its practical application to thereby enable others skilled in the art to best utilize the invention in various embodiments and various modifications as are suited to the particular use contemplated. For example, while the preferred embodiment of the control system is shown used in conjunction with coupled-in-motion weighing system, it is clear that in accordance with the broadest aspects of the invention the concept can be applied to batch weighing. In a batch weighing arrangement typically using an overhead weighing hopper, signals are provided to step 50 in the program indicating either the excess amount remaining in the batch hopper, or the amount short to make the target weight, and then the chute control at step 52 is activated. The chute 12 should be raised to shift the weight to the front (where excess coal remains in the batch), or shift to the rear where the supply is exhausted before the car is filled. Thus, it's intended that the scope of the invention be defined only by the claims appended hereto.

I claim:

1. An apparatus for loading a target weight of fluent bulk material into a continuously moving train with cars passing a load-out station comprising:
   a scale means upon which the front and rear of a car is supported during loading being operable to weigh said front and rear of said car before loading and during loading;
   a movable load-out chute at the load-out station to direct fluent bulk material into said car;
   leveling means on said chute to smooth out said fluent bulk material in said car;
   adjustment means for moving said chute up and down; and
   computer means operably connected to said adjusting means and said scale means for comparing the weight of said front and rear of each car in time with the train movement of cut off the flow when a predetermined amount of weight is on said scale means to also control said adjustment means to position said chute in the next identically sized following car to achieve even loading on said front and rear of said next identically sized following car.

2. The loading apparatus of claim 1 wherein said leveling means comprises a discharge end on said load-out chute and a lip on said discharge end to smooth the upper surface of the fluent material in both the longitudinal and transverse directions.

3. The loading apparatus of claim 2 wherein said adjusting means includes a movable mounting for said chute and motor means for raising said chute to shift the weight toward the front of the car and lowering the chute to shift the weight toward the rear.

4. The loading apparatus of claim 3 wherein said movable mounting comprises a pivot to permit swinging action of the chute.

5. The loading apparatus of claim 4 wherein said motor means includes a hydraulic cylinder connected to the side of the chute.

6. An apparatus for loading a target weight of a fluent bulk material, such as coal, into a continuously moving train with cars passing a load-out station comprising
   a scale means for weighing the front and rear of each car in line;
   a load-out chute in the load-out station for substantially evenly feeding the material into each car,
   means for regulating the height of the material fed into each car, said regulating means including means for adjusting the height of said chute, and
   computer means for comparing the weight signals from the front and rear of each car and means for adjusting said regulating means to position said chute to substantially even the load for comparable cars following in line.

7. The loading apparatus of claim 6 wherein said load-out chute includes a discharge end and a lip on said discharge end to smooth the upper surface of the fluent material in both the longitudinal and transverse directions.

8. The loading apparatus of claim 6 wherein said computer means includes sensing means for denoting the position of each car at the load-out station for loading.

9. The loading apparatus of claim 8 wherein said computer means includes sensing means for determining the height of each car.

10. The loading apparatus of claim 9 wherein said sensing means are photocell arrays.

11. A method for loading a target weight of bulk material, such as coal, into a continuously moving train with cars passing a load-out station comprising the steps of
 feeding the material through a load-out chute at the load-out station evenly along the length of each car, said load-out chute having a discharge end;
 weighing the front and rear of each car before and during said feeding step;
 smoothing out the material fed into each car during said feeding step;
 comparing the weight of the front and rear of each car in time with the train movement; and
 adjusting the vertical position of said discharge end of said chute in comparable cars following in line to achieve even loading in the front and rear of said comparable cars.

12. The method of claim 11 wherein is further provided the step of storing in memory the chute position for the most recent comparable car in the train.

13. The loading method of claim 11 including the further step of terminating the flow of material to each car in response to reaching the target weight or coming to the end of the car, whichever occurs first.

14. An apparatus for loading fluent bulk material into a series of moving containers passing a load-out station, comprising:
 a movable load-out chute at the load-out station for loading fluent bulk material into said containers, said load-out chute having a flow gate and a discharge end;
 means for controllably opening and closing said flow gate for each container;
 means for positioning said discharge end of said load-out chute at a plurality of vertical levels;
 scale means for detecting imbalance in a first container loaded with fluent bulk material by said apparatus; and
 means for compensating for imbalance detected by said sqale means, said compensating means including means for determining a new vertical level for said discharge end of said load-out chute for loading a subsequent container.

15. The loading apparatus of claim 14 further comprising means for recognizing multiple container types.

16. The loading apparatus of claim 15 further comprising sensing means for determining the height of each container.

17. The loading apparatus of claim 16 wherein said sensing means includes photocell arrays.

18. The loading apparatus of claim 17 further comprising means for sensing the leading and trailing edges of each container.

19. The loading apparatus of claim 18 wherein said scale means includes means for weighing the front and rear of each container before loading.

20. The loading apparatus of claim 19 further comprising means for smoothing the upper surface of the fluent material in both the longitudinal and transverse directions.

21. The loading apparatus of claim 20 wherein said positioning means includes a movable mounting for said chute and motor means for raising said chute to shift the weight toward the front of the container and lowering the chute to shift the weight toward the rear.

22. The loading apparatus of claim 21 wherein said movable mounting includes a pivot to permit swinging action of the chute.

23. The loading apparatus of claim 22 wherein said motor means includes a hydraulic cylinder connected to the side of the chute.

24. The loading apparatus of claim 14 further comprising means for sensing the leading and trailing edges of each container.

25. The loading apparatus of claim 14 wherein said scale means includes means for weighing the front and rear of each container before loading.

26. A method of loading fluent bulk material into a series of moving containers passing a load-out station, comprising the steps of:
 supplying fluent bulk material to a movable load-out chute located at the load-out station and having a flow gate and a discharge end;
 positioning said discharge end of said load-out chute at a first vertical level for loading a first container;
 controllably opening and closing said flow gate to initiate and terminate loading of said first container;
 detecting imbalance in said first loaded container; compensating for imbalance detected in said detecting step, said compensating step including the step of determining a new vertical level for said discharge end of said load-out chute for loading a subsequent container; and
 controllably opening and closing said flow gate to initiate and terminate loading of said subsequent container.

27. The method of claim 26 further comprising the step of recognizing multiple container types, wherein said compensating step includes determining the new vertical level as a function of imbalance detected in a first loaded container of the same type as the subsequent container to be loaded.

28. The method of claim 27 wherein said recognizing step is performed with a height sensor including a photocell array.

29. The method of claim 28 further comprising the step of sensing the leading and trailing edges of each container.

30. The method of claim 29 further comprising the step of weighing the front and rear of each container before loading.

31. The method of claim 30 further comprising the step of terminating the flow of material to each container in response to reaching a target weight or coming to the end of the container, whichever occurs first.

* * * * *

UNITED STATES PATENT AND TRADEMARK OFFICE
CERTIFICATE OF CORRECTION

PATENT NO. : 4,659,274

DATED : April 21, 1987

INVENTOR(S) : Rodney C. France

It is certified that error appears in the above-identified patent and that said Letters Patent is hereby corrected as shown below:

In block 73 of title page, please insert "Pebco, Inc., Paducah, Ky."

In column 3, line 32, please change "etecting" to --detecting--.

In column 3, line 43, please change "initaite" to --initiate--.

In column 8, line 19, please insert --and-- after "means", first occurrence.

In column 8, line 39, please delete "a" before --fluent--.

In column 9, line 40, please change "sqale" to --scale--.

Signed and Sealed this

Eighth Day of September, 1987

Attest:

DONALD J. QUIGG

Attesting Officer

Commissioner of Patents and Trademarks